(12) United States Patent
Ito

(10) Patent No.: US 10,774,767 B2
(45) Date of Patent: Sep. 15, 2020

(54) CATALYST DIAGNOSIS DEVICE

(71) Applicant: HONDA MOTOR CO., LTD., Minato-ku, Tokyo (JP)

(72) Inventor: Atsushi Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 14 days.

(21) Appl. No.: 16/089,216

(22) PCT Filed: Mar. 29, 2016

(86) PCT No.: PCT/JP2016/060197
§ 371 (c)(1),
(2) Date: Sep. 27, 2018

(87) PCT Pub. No.: WO2017/168580
PCT Pub. Date: Oct. 5, 2017

(65) Prior Publication Data
US 2020/0032730 A1    Jan. 30, 2020

(51) Int. Cl.
*F02D 41/14* (2006.01)
*B01D 53/94* (2006.01)
(Continued)

(52) U.S. Cl.
CPC ..... *F02D 41/1458* (2013.01); *B01D 53/9454* (2013.01); *F01N 3/101* (2013.01);
(Continued)

(58) Field of Classification Search
CPC combination set(s) only.
See application file for complete search history.

(56) References Cited

U.S. PATENT DOCUMENTS 5,088,281 A    2/1992   Izutani et al.
7,159,385 B2 *  1/2007   Uchida ............... F02D 41/0295
                                                              123/443
(Continued)

FOREIGN PATENT DOCUMENTS

EP    1 452 713 A2   9/2004
EP    2 133 529 A1  12/2009
(Continued)

OTHER PUBLICATIONS

Office Action, Notification of Reasons for Refusal, dated May 8, 2019, issued in the corresponding Japanese Patent Application No. 2018-507894, with the English translation thereof.
(Continued)

*Primary Examiner* — Binh Q Tran
(74) *Attorney, Agent, or Firm* — Carrier Blackman & Associates, P.C.; Joseph P. Carrier; Jeffrey T. Gedeon

(57) ABSTRACT

The present invention provides a catalyst diagnosis device that enables precisely grasping a variation of AFR and diagnosing a deteriorated condition of the catalyst based on the variation. A timer counts elapsed time Tosc until downstream AFU (AFRd) meets a predetermined threshold condition when the fuel injection quantity is corrected by increasing or decreasing it so that as to the AFRu, the transition from either of leanness or richness to the other is repeated with the stoichiometric area between the leanness and the richness. An OSA calculating section calculates an Oxygen Storage Amount (OSA) as a function of the ΔAFR, Mfuel, Ne and Tosa. An OPA calculating section calculates an Oxygen Purge Amount (OPA) as a function of the ΔAFR, Mfuel, Ne and Topa. A deterioration diagnosing section diagnoses a deteriorated condition of the catalyst C on the basis of at least one of the OSA and OPA.

3 Claims, 7 Drawing Sheets

(51) Int. Cl.
*F01N 3/10* (2006.01)
*F01N 11/00* (2006.01)
*F02D 41/02* (2006.01)
*F02D 41/30* (2006.01)

(52) U.S. Cl.
CPC .......... *F01N 11/007* (2013.01); *F02D 41/027* (2013.01); *F02D 41/0295* (2013.01); *F02D 41/1441* (2013.01); *F02D 41/1456* (2013.01); *F02D 41/1479* (2013.01); *F02D 41/3005* (2013.01); *F01N 2550/02* (2013.01); *F02D 2200/0814* (2013.01); *F02D 2200/101* (2013.01)

(56) References Cited

U.S. PATENT DOCUMENTS

| | | | | |
|---|---|---|---|---|
| 7,430,853 | B2* | 10/2008 | Kohara | F01N 11/007 60/276 |
| 9,670,819 | B2 | 6/2017 | Aoki et al. | |
| 2004/0134185 | A1 | 7/2004 | Wackerow et al. | |
| 2006/0090456 | A1* | 5/2006 | Tani | F01N 11/007 60/285 |
| 2008/0154476 | A1* | 6/2008 | Takubo | F01N 11/007 701/101 |
| 2009/0313974 | A1* | 12/2009 | Iida | F01N 11/007 60/287 |
| 2010/0050602 | A1* | 3/2010 | Fujimoto | F01N 11/007 60/277 |
| 2011/0219746 | A1 | 9/2011 | Yezerets et al. | |
| 2015/0089927 | A1* | 4/2015 | Kubo | F02D 41/1454 60/277 |

FOREIGN PATENT DOCUMENTS

| | | |
|---|---|---|
| JP | H02-030915 A | 2/1990 |
| JP | H02-033408 A | 2/1990 |
| JP | H02-207159 A | 8/1990 |
| JP | 2005-127259 A | 5/2005 |
| JP | 2005-163618 A | 6/2005 |
| JP | 2008-291751 A | 12/2008 |
| JP | 2012-117406 A | 6/2012 |
| JP | 5835478 B2 | 12/2015 |
| WO | 2015/194155 A1 | 12/2015 |

OTHER PUBLICATIONS

PCT/ISA/210 from International Application PCT/JP2016/060197 with the English translation thereof.
Extended European search report dated Mar. 19, 2019 in the corresponding patent application No. 16896800.6.

* cited by examiner

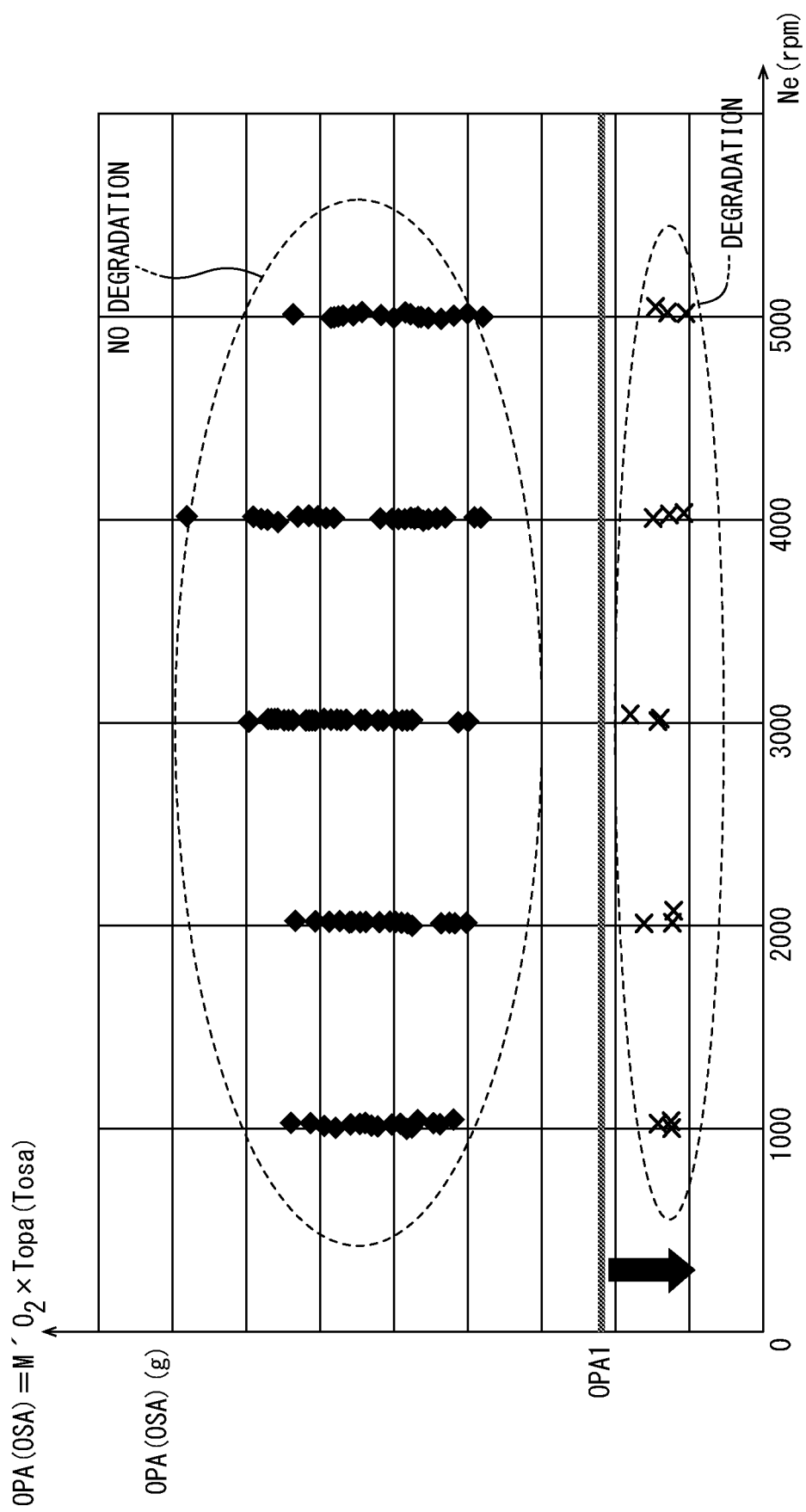

CATALYST DIAGNOSIS DEVICE

TECHNICAL FIELD

The present invention relates to a catalyst diagnosis device that diagnoses deterioration of a catalyst for purging exhaust gas of an engine on the basis of Air/fuel ratio (AFR) detected by a pair of sensors provided on an upstream side and on a downstream side thereof.

BACKGROUND ART

A system provided with a catalyst in an exhaust system of an engine for purging exhaust gas is widely known. As purging performance of the catalyst is deteriorated by long-term use, various methods for detecting the deterioration are proposed.

A patent literature 1 discloses technique for executing active AFR control that transition from leanness to richness and transition from richness to leanness as to AFR of exhaust gas flowing into the catalyst are alternately repeated, integrating oxygen purge amounts on the basis of transition of the AFR of exhaust gas flowing into the catalyst, an exhaust flow rate and others in the transition to richness, integrating oxygen storage amounts on the basis of transition of the AFR of exhaust gas flowing into the catalyst, an exhaust flow rate and others in the transition to leanness and making catalyst deterioration diagnosis on the basis of each integrated value in a catalyst deterioration determination system that determines deterioration of an exhaust purge catalyst provided with an oxygen storage facility.

CITATION LIST

Patent Literature

Patent Document 1: Japanese Patent No. 5835478

SUMMARY OF INVENTION

Technical Problem

In the above-mentioned related art, the oxygen purge amount and the oxygen storage amount respectively to be a capacity index of the catalyst are estimated on the basis of theoretical AFR (stoichiometry) and AFR detected on the upstream side of the catalyst. However, according to such an estimate method, as a variation of AFR on the downstream side of the catalyst cannot be taken, a deteriorated condition of the catalyst cannot be precisely diagnosed.

The present invention provides a catalyst diagnosis device that enables precisely grasping a variation of AFR on the downstream side of a catalyst and enables diagnosing a deteriorated condition of the catalyst on the basis of the variation.

Solution to Problems

To achieve the afore-mentioned object, the present invention has a following feature in a catalyst diagnosis device which is provided with each AFR sensor on an upstream side and on a downstream side of a catalyst provided in an exhaust passage of an engine and which determines deterioration of the catalyst on the basis of output of each AFR sensor.

(1) The present invention has a first feature for comprising means for controlling a fuel injection quantity in order to turn AFR detected on the upstream side of the catalyst from either of leanness or richness to the other across reference AFR set in a stoichiometric area between the leanness and the richness, means for timing elapsed time since the AFR on the upstream side is turned from the either to the other until AFR detected by the AFR sensor on the downstream side meets a predetermined threshold condition; means for calculating oxygen storage capacity (OSC) of the catalyst on the basis of the elapsed time and means for diagnosing deterioration of the catalyst on the basis of the oxygen storage capacity.

(2) The present invention has a second feature in that the means for timing the elapsed time counts elapsed time since the upstream AFR is turned lean until the AFR detected by the AFR sensor on the downstream side meets the predetermined threshold condition, and the means for calculating the oxygen storage capacity of the catalyst calculates an oxygen storage amount (OSA) of the catalyst in a reducing atmosphere on the basis of the elapsed time.

(3) The present invention has a third feature in that the means for timing the elapsed time counts elapsed time since AFR before the catalyst is turned rich until AFR detected by the AFR sensor on the downstream side meets the predetermined threshold condition, and the means for calculating the oxygen storage capacity of the catalyst calculates an oxygen purge amount (OPA) of the catalyst in an oxidizing atmosphere on the basis of the elapsed time.

(4) The present invention has a fourth feature for comprising means for controlling upstream AFR in a stoichiometric area only in a predetermined period before the fuel injection quantity is controlled.

Advantageous Effects of Invention

According to the present invention, the following effects are achieved.

(1) According to the first feature of the present invention, the change in AFR on the downstream side of the catalyst is detected and compared with the change in AFR on the upstream side of the catalyst, the OSC of the catalyst is obtained and the deteriorated state is diagnosed on the basis of the comparison. Therefore, diagnosis reflecting a variation of AFR on the downstream side of the catalyst is enabled.

(2) According to the second feature of the present invention, an oxygen storage amount (OSA) of the catalyst in a reducing atmosphere is calculated on the basis of the elapsed time since the upstream AFR is turned lean until the AFR detected by the AFR sensor on the downstream side meets the predetermined threshold condition. Therefore, diagnosis based upon oxygen storage capacity of the catalyst is enabled.

(3) According to the third feature of the present invention, an oxygen purge amount (OPA) of the catalyst in an oxidizing atmosphere is calculated on the basis of the elapsed time since the upstream AFR is turned rich until the AFR detected by the AFR sensor on the downstream side meets the predetermined threshold condition. Therefore, diagnosis based upon oxygen purge capacity of the catalyst is enabled.

(4) According to the fourth feature of the present invention, before controlling the fuel injection amount, the upstream AFR is controlled to a reference AFR that is appropriately set within a range of stoichiometry ±5% (stoichiometric region) for a predetermined period. Therefore, diagnosis can be started on the same condition at all times and precise diagnosis uninfluenced by an exhaust atmosphere before a start of diagnosis is enabled.

BRIEF DESCRIPTION OF DRAWINGS

FIG. 7 shows diagnosis.

DESCRIPTION OF EMBODIMENTS

Figure 1:
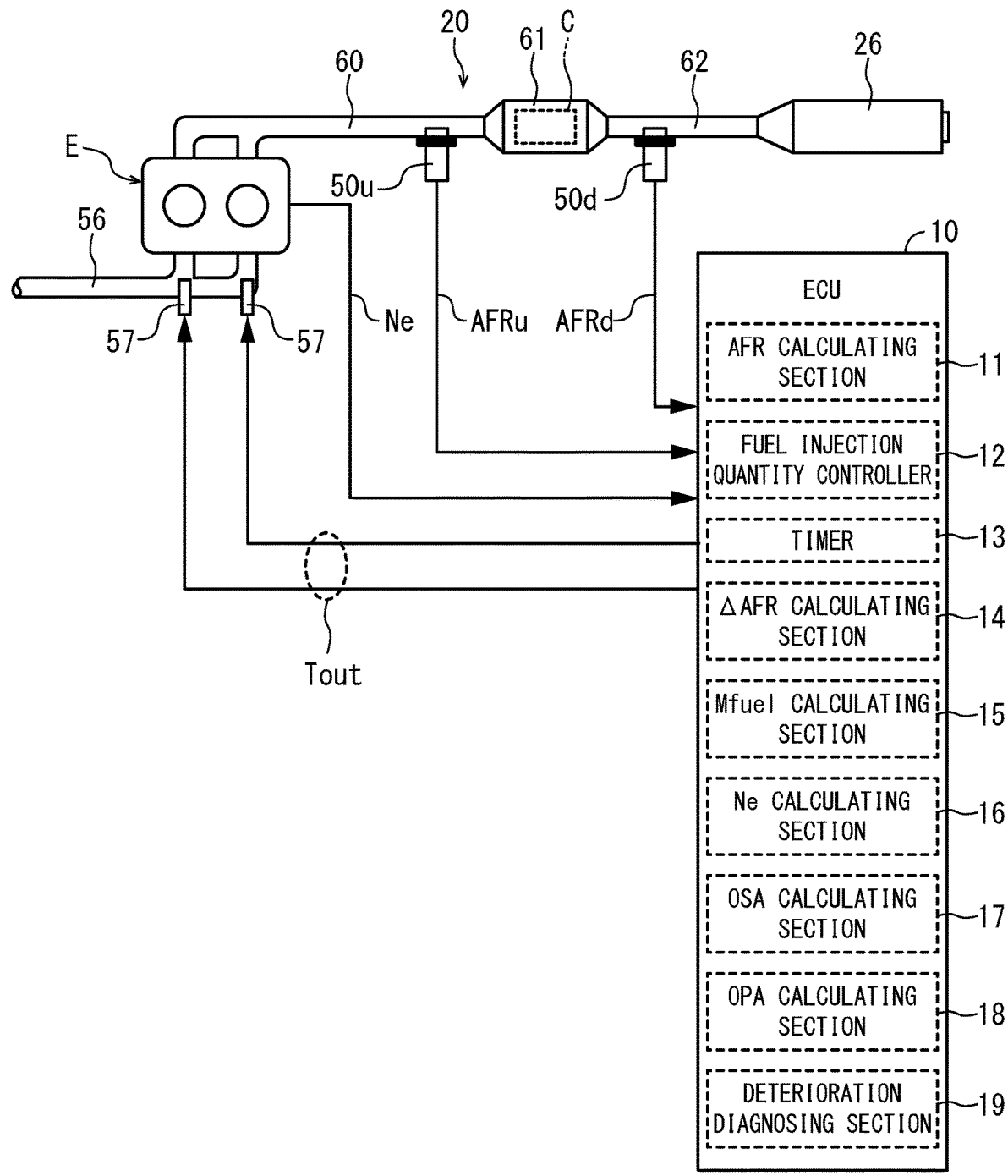
FIG. 1 is a block diagram showing an exhaust system to which the present invention is applied.

FIG. 1 is a block diagram showing an exhaust system 20 to which the present invention is applied and in FIG. 1, application to a motorcycle is shown as an example.

On the intake side of an engine E, an intake pipe 56 provided with an injector 57 every cylinder is attached. On the exhaust side of the engine E, a catalyzer 61 is coupled via an outlet pipe 60 and a muffler 26 is coupled to the downstream side of the catalyzer via an exhaust pipe 62.

The catalyzer 61 houses a catalyst C for purging exhaust gas, and an AFR sensor 50$u$ that detects AFR of exhaust gas and an O2 sensor 50$d$ that detects oxygen concentration are attached on the upstream side and on the downstream side of the catalyzer. For the AFR sensor 50$u$, the O2 sensor or an LAF sensor can be used. For the oxygen concentration sensor 50$d$, the O2 sensor or the LAF sensor can be also used. When the O2 sensor is used, its output value is required to be converted to AFR.

In ECU 10, an AFR calculating section 11 calculates AFR of exhaust gas on the basis of output signals from the sensors 50$u$, 50$d$. A fuel injection quantity controller 12 controls a fuel injection quantity by controlling open time Tout of the injector 57.

The fuel injection quantity controller 12 is provided with a diagnostic injection facility in addition to a normal injection facility for properly controlling the fuel injection quantity while a vehicle is driven. The diagnostic injection facility corrects the fuel injection quantity by increasing or decreasing the fuel injection quantity so that as to upstream AFR (AFRu) detected by the AFR sensor 50$u$, transition from richness to leanness and transition from leanness to richness are alternately repeated after making feedback control that AFR is to be reference AFR in a stoichiometric area only in a predetermined period in a catalytic diagnostic cycle.

A timer 13 counts elapsed time Tosc (a generic name of Tosa and/or Topa) until downstream AFR (AFRd) detected by the downstream sensor 50$d$ meets a predetermined threshold condition when the fuel injection quantity is corrected by increasing or decreasing it by the diagnostic injection facility of the fuel injection quantity controller 12 so that as to the AFRu, the transition from either of leanness or richness to the other is repeated with the stoichiometric area between the leanness and the richness as described later.

A ΔAFR calculating section 14 calculates difference ΔAFR between average values of AFRs detected by each sensor 50$u$, 50$d$ in Tosc (Tosa, Topa). An Mfuel calculating section 15 calculates fuel weight Mfuel per cycle of the engine. An Ne calculating section 16 calculates an average value of the number of revolutions Ne of the engine E in Tosc and adopts the average value as Ne in catalytic diagnosis.

An OSA calculating section 17 calculates an Oxygen Storage Amount (OSA) in a reducing atmosphere of the catalyst as a function of the ΔAFR, Mfuel, Ne and Tosa as described later. An OPA calculating section 18 calculates an Oxygen Purge Amount (OPA) in an oxidizing atmosphere of the catalyst as a function of the ΔAFR, Mfuel, Ne and Topa as described later. A deterioration diagnosing section 19 diagnoses a deteriorated condition of the catalyst C on the basis of at least one of the OSA and OPA.

Figure 2:
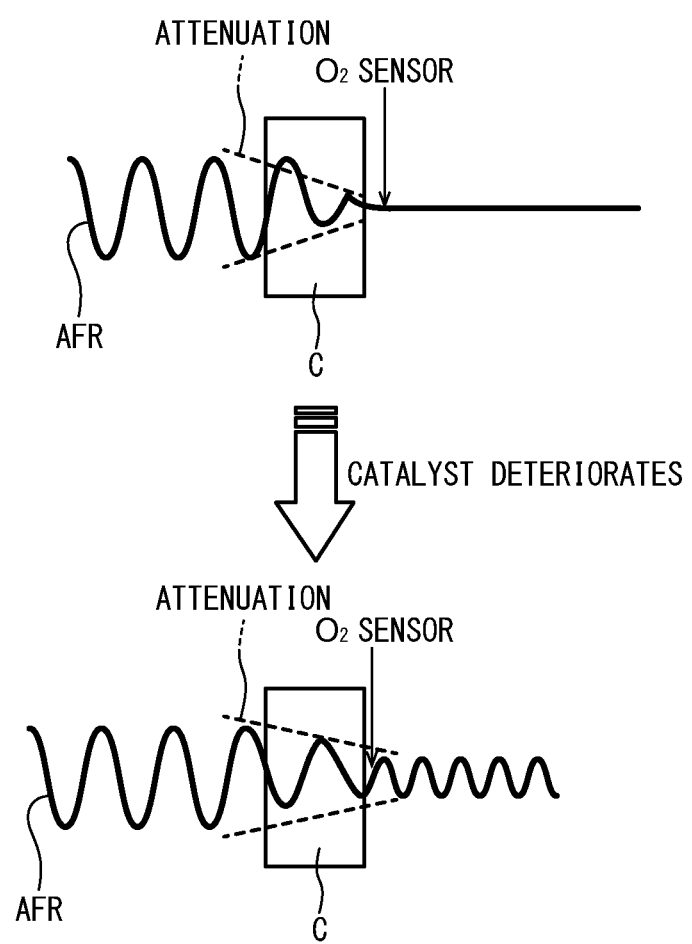
FIG. 2 schematically represent a catalyst deterioration diagnosis method in the present invention.
Figure 3:
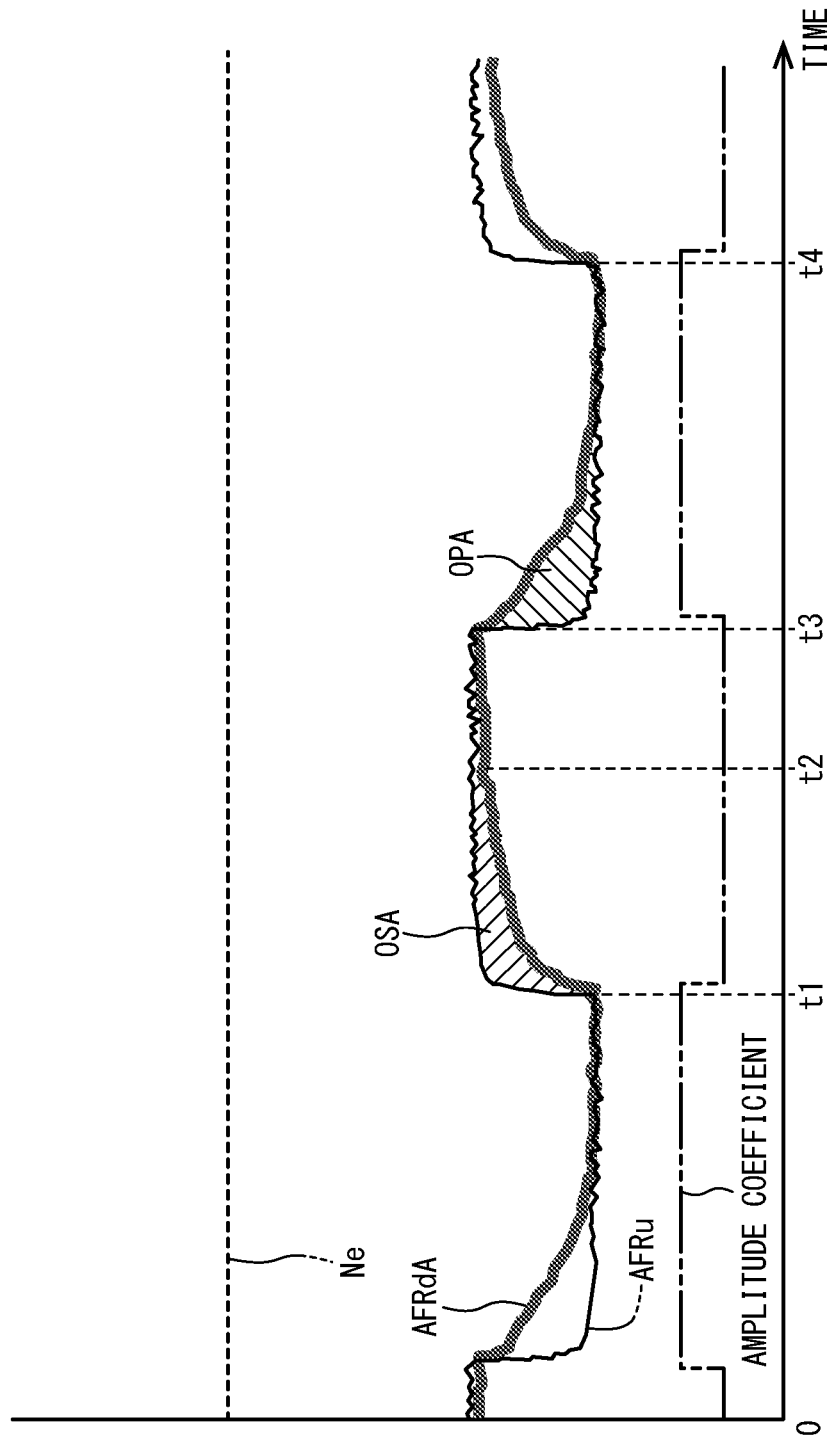
FIG. 3 schematically represents a catalyst deterioration diagnosis method in the present invention.

FIGS. 2 and 3 schematically represent a catalyst deterioration diagnosis method in the present invention. When the fuel injection quantity is controlled so that as to the AFRu of the catalyst C, the transition from either of leanness or richness to the other is repeated, an oxygen content in exhaust gas is approximately fixedly held as shown in FIG. 2 if the catalyst C sufficiently functions and its oxygen storage facility and its oxygen purge facility are sufficiently exercised. Hereby, oxidation of hydrocarbon (HC) and carbon monoxide (CO) by purge of stored oxygen is accelerated and besides, a purge is realized by action for accelerating reduction of NOx by storage of excessive oxygen.

When the catalyst is deteriorated, oxygen storage capacity and oxygen purge capacity are deteriorated, variation of an oxygen content in exhaust gas cannot be inhibited as shown in FIG. 2 and as its oxygen concentration is rich or lean, purge capacity of HC, CO and NOx is deteriorated.

In the present invention, as shown in FIG. 3, the OSA and OPA of the catalyst C are estimated by comparing the AFRu and AFRd detected on the upstream side and on the downstream side of the catalyst C and it is diagnosed that when these are smaller than predetermined reference values, the catalyst C is deteriorated.

Figure 4:
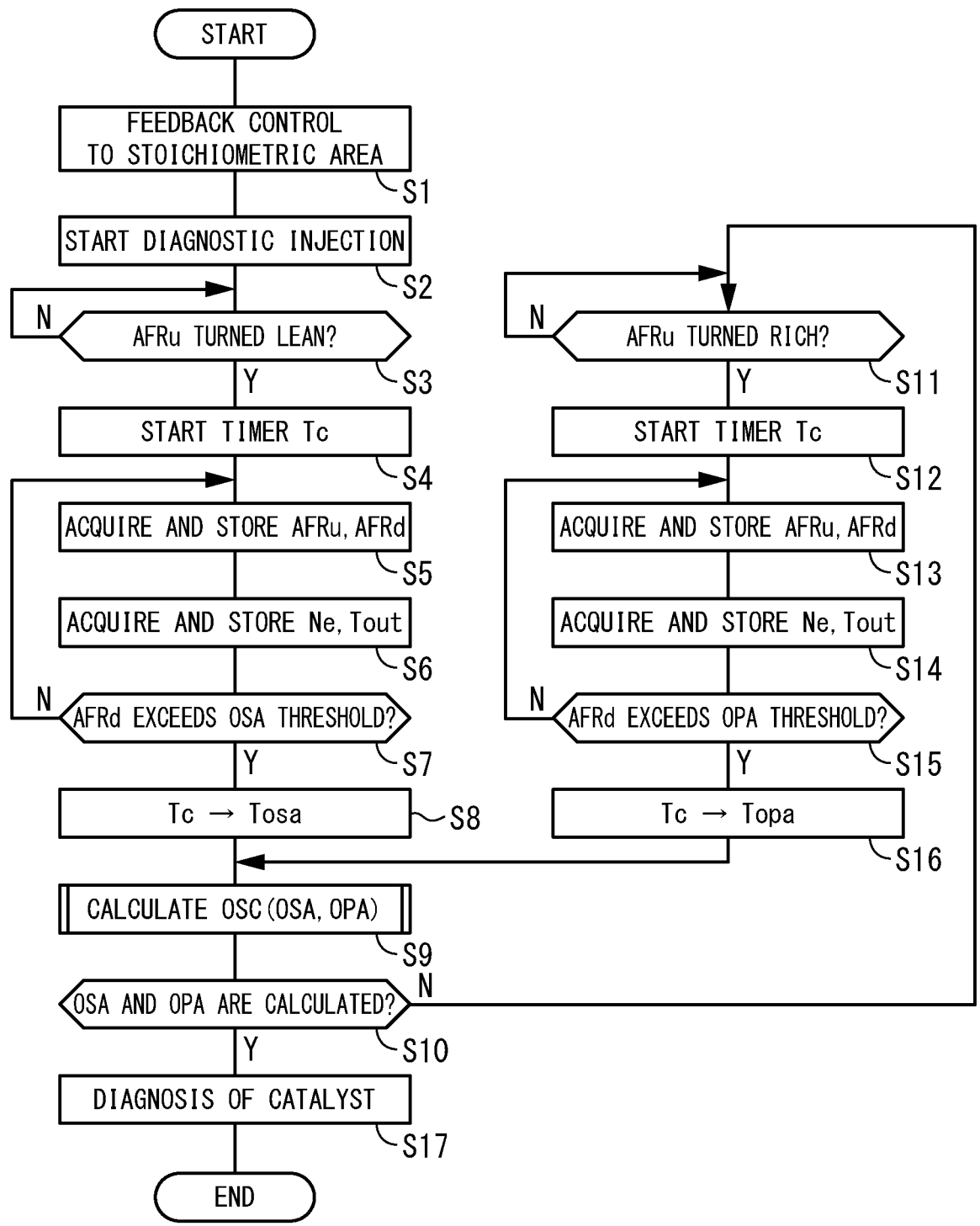
FIG. 4 is a flowchart showing operation in one embodiment of the present invention.
Figure 5:
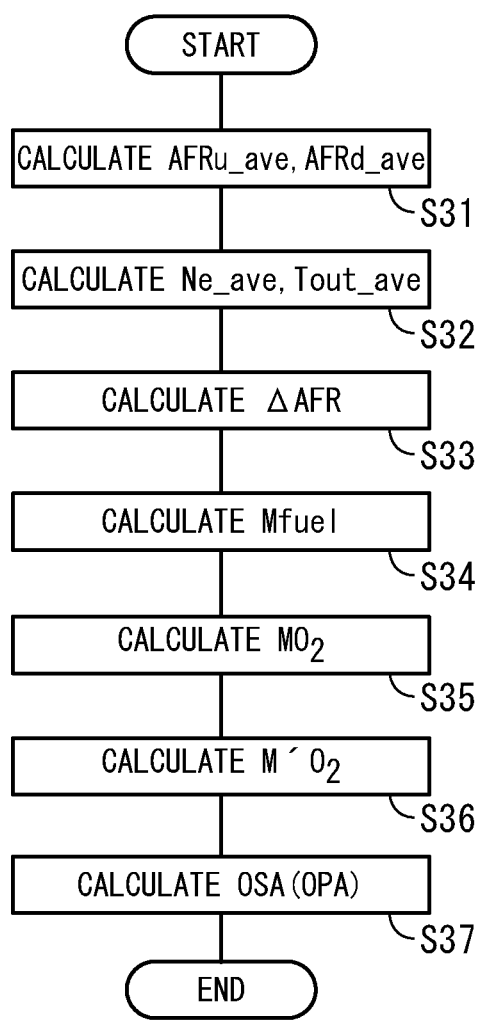
FIG. 5 is a flowchart showing a procedure for calculating OSC.
Figure 6:
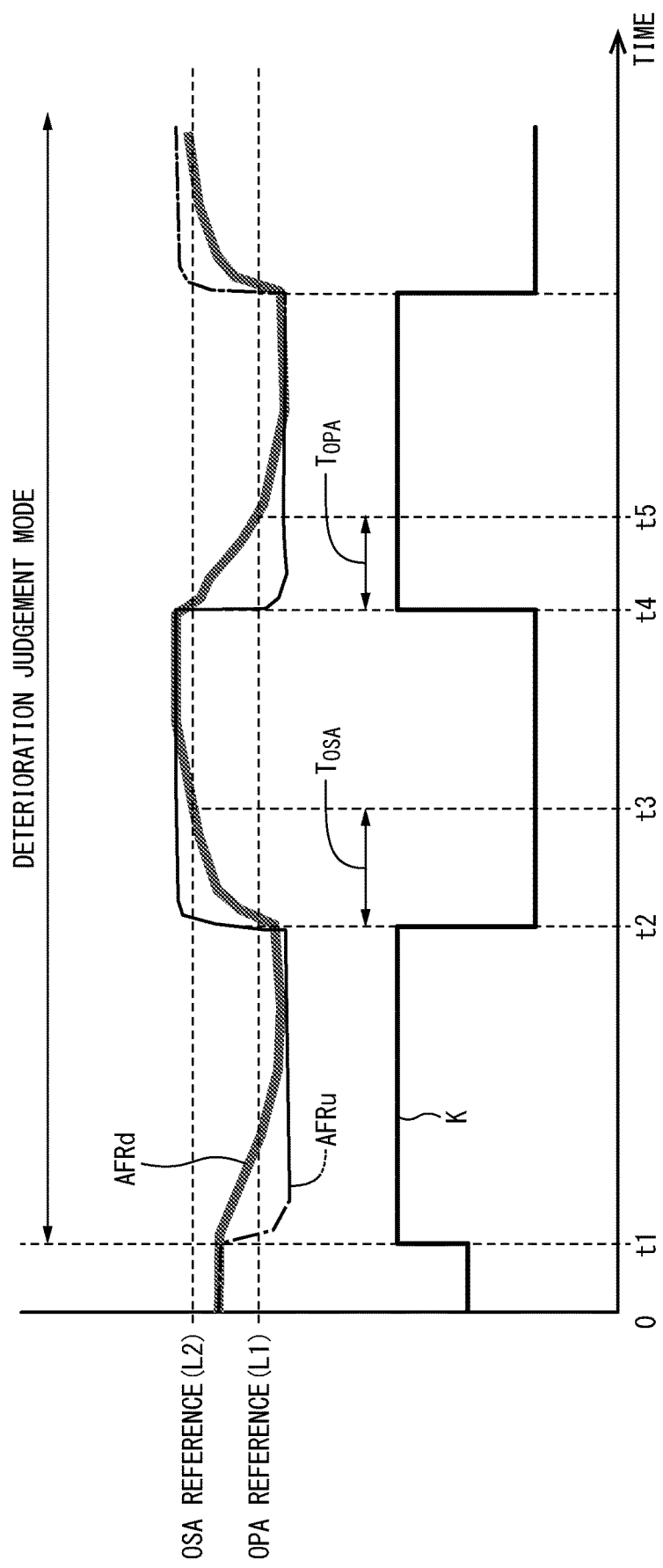
FIG. 6 is a timing chart showing the operation in one embodiment of the present invention.

FIG. 4 is a flowchart showing operation in one embodiment of the present invention. FIG. 5 is a flowchart showing a procedure for calculating OSC. FIG. 6 is a timing chart showing the operation in one embodiment of the present invention.

In a step S1, feedback control is applied to the fuel injection quantity by the fuel injection quantity controller 12 so that the AFRu of exhaust gas is maintained in an arbitrary reference AFR area. In this embodiment, a range of ±5% as to 14.55 as ideal AFR is allowed as the reference AFR area.

In a step S2, at time t1 shown in FIG. 6, diagnostic injection in which correction of the fuel injection quantity by increasing or decreasing it is repeated in the predetermined cycle is started. In this case, the fuel injection quantity is corrected to be increased at first by switching an injection correction factor K of fuel and hereby, the AFRu is turned rich.

Afterward, when the fuel injection quantity is switched to correction for decrease by the diagnostic injection facility, it is determined whether the AFRu detected by the upstream sensor 50$u$ is turned lean or not in a step S3. At time t2, when it is detected that the AFRu is turned from richness to leanness, a process proceeds to a step S4 and the timer Tc starts timing.

In a step S5, the AFRu and the AFRd are acquired and stored. In a step S6, the fuel injection quantity represented by Ne and Tout is acquired and stored.

In a step S7, it is determined whether the AFRd exceeds a predetermined OSA threshold or not. When the AFRd is smaller than the OSA threshold, the process is returned to the step S5, and the acquisition and storage of the AFRu and AFRd and the acquisition and storage of the NE and Tout are repeated in a predetermined cycle.

At time t3, the AFRd is turned larger than or equal to the OSA threshold, and when this is detected in the step S7, the process proceeds to a step S8. In the step S8, a value measured by the timer Tc is registered as OSA time Tosa and the timer Tc is reset. In a step S9, as described in detail later, OPA is calculated on the basis of the Tosa.

In a step S10, it is determined whether both the OSA and the OPA are already calculated or not. When either is not calculated yet, the process proceeds to a step S11 and it is determined whether the AFRu is turned rich or not.

The injection quantity is switched to correction for increasing it again by the diagnostic injection facility, at time t4, the AFRu is turned from leanness to richness, and when the transition is detected in the step S11, the process proceeds to a step S12 and the timer Tc starts timing. In a step S13, the AFRu and AFRd are acquired and stored. In a step S14, Ne and Tout are acquired and stored.

In a step S15, it is determined whether the AFRd is below a predetermined OPA threshold or not. When the AFRd is below the OPA threshold, the process is returned to the step S13, and the acquisition and storage of the AFRu and AFRd and the acquisition and storage of the NE and Tout are repeated in the predetermined cycle.

At time t5, the AFRd is equal to or below the OPA threshold and when this is detected in the step S15, the process proceeds to a step S16. In the step S16, a value measured by the timer Tc is registered as Topa and a count value of the timer Tc is reset. In the step S9, the OPA is calculated on the basis of the Topa.

In the above-mentioned embodiment, it is described that the elapsed time Tosc (Tosa and/or Topa) is acquired on the basis of the AFRd; however, the present invention is not limited to only this, and elapsed time may be also acquired on the basis of output voltage from the O2 sensor.

In a step S31 shown in FIG. 5, each average value AFRu_ave, AFRd_ave of the AFRu and AFRd in an OSC period (an OSA period or an OPA period) is calculated.

In a step S32, each average value Ne_ave and Tout_ave of the NE and Tout in the OSC period is calculated. In a step S33, difference $\Delta$AFR between the AFR on the upstream side and the AFR on the downstream side of the catalyst detected by each sensor $50u$, $50d$ is calculated in the following expression (1).

$$\Delta AFR = |AFRu\_ave - AFRd\_ave| \quad (1)$$

In a step S34, fuel injection weight Mfuel per cycle is calculated on the basis of an integrated value of the Tout and an injection characteristic. In a step S35, a remaining oxygen content MO2 per cycle is calculated on the basis of the $\Delta$AFR and the Mfuel per cycle. In a step S36, a mass flow rate M'O2 per second of remaining oxygen is calculated in the following expression (2).

$$M'O2 = (MO2 \times Ne)/120 \quad (2)$$

In a step S37, the OSA and OPA are calculated in the following expressions (3), (4).

$$OSA(g) = M'O2 \times Tosa \quad (3)$$

$$OPA(g) = M'O2 \times Topa \quad (4)$$

As shown in FIG. 4 again, in the step S10, when it is determined that both the OSA and the OPA are already calculated, the process proceeds to a step S17. In the step S17, a deteriorated condition of the catalyst is determined on the basis of the OSA and OPA. In this embodiment, when both the OSA and the OPA are below the predetermined reference values or either of them is below the reference value, it is diagnosed that the catalyst is deteriorated.

FIG. 7 shows determination results of the OSA and OPA of measuring them in plural samples, varying a throttle angle with the Ne fixed and it can be verified that highly selective diagnostic results are acquired irrespective of an engine operational state.

In the above-mentioned embodiment, it is described that both the OSA and OPA as the OSC are calculated; however, only either may be calculated, and catalyst diagnosis may be also made on the basis of only either.

REFERENCE SIGNS LIST

10 . . . ECU, 11 . . . AFR calculating section, 12 . . . fuel injection quantity controller, 13 . . . timer, 14 . . . $\Delta$AFR calculating section, 15 . . . Mfuel calculating section, 16 . . . Ne calculating section, 17 . . . OSA calculating section, 18 . . . OPA calculating section, 20 . . . exhaust system, 26 . . . muffler, $50u$, $50d$ . . . AFR sensor, 56 . . . intake pipe, 57 . . . injector, 60 . . . outlet pipe, 61 . . . catalyzer, 62 . . . exhaust pipe

The invention claimed is:

1. A catalyst diagnosis device which is provided with each Air/fuel ratio (AFR) sensor on an upstream side and on a downstream side of a catalyst provided in an exhaust passage of an engine and which determines deterioration of the catalyst on the basis of output of each AFR sensor, the catalyst diagnosis device comprises an electronic control unit (ECU) configured to function as:
   a fuel injection quantity controller which controls a fuel injection quantity in order to effect a state change on the AFR detected on the upstream side of the catalyst from a lean state to a rich state or from the rich state to the lean state across reference AFR set in a stoichiometric area between the lean state and the rich state;
   a timer which counts elapsed time since the state change on the AFR on the upstream side until AFR detected by the AFR sensor on the downstream side meets a predetermined threshold condition;
   an Oxygen Storage Amount (OSA) calculating section which calculates oxygen storage capacity (OSC) of the catalyst on the basis of the elapsed time;
   a deterioration diagnosing section which diagnoses a deterioration of the catalyst on the basis of the oxygen storage capacity; and
   an oxygen purge amount (OPA) calculating section which calculates an oxygen purge amount of the catalyst in an oxidizing atmosphere on the basis of the elapsed time;
   wherein the OSA calculating section includes:
      an AFR calculating section which calculates a difference between average values of AFRs detected by each sensor in the elapsed time;
      a fuel weight per cycle of the engine (Mfuel) calculating section which calculates fuel weight per cycle of the engine; and
      an engine speed (Ne) calculating section which calculates engine speed,
   wherein the oxygen storage capacity of the catalyst is calculated as a function of the difference between the average values of the AFRs, the fuel weight, the engine speed and the elapsed time, and
   wherein the elapsed time counted by the timer since the state change from the lean state to the rich state on the AFR before the catalyst until AFR detected by the AFR sensor on the downstream side meets the predetermined threshold condition.

2. The catalyst diagnosis device according to claim 1,
wherein the elapsed time counted by the timer since the state change from the rich state to the lean state on the upstream AFR until the AFR detected by the AFR sensor on the downstream side meets the predetermined threshold condition, and the OSA calculating section which calculates the oxygen storage capacity of the catalyst calculates an oxygen storage amount (OSA) of the catalyst in a reducing atmosphere on the basis of the elapsed time.

3. The catalyst diagnosis device according to claim 1, wherein the fuel injection quantity controller further controls upstream AFR in a stoichiometric area only in a predetermined period before the fuel injection quantity is controlled.

* * * * *